United States Patent [19]

Holz

[11] Patent Number: 4,842,722
[45] Date of Patent: Jun. 27, 1989

[54] PRESSURE SORTER

[75] Inventor: Emil Holz, Eningen, Fed. Rep. of Germany

[73] Assignee: Hermann Finckh Maschinenfabrik GmbH & Co., Fed. Rep. of Germany

[21] Appl. No.: 72,875

[22] Filed: Jul. 14, 1987

[30] Foreign Application Priority Data

Jul. 15, 1986 [EP] European-Pat. Off. ........ 86109682.4

[51] Int. Cl.⁴ .............................................. B07B 1/24
[52] U.S. Cl. ................................... 209/270; 209/303; 209/384; 209/397
[58] Field of Search ............... 209/262, 268, 270, 273, 209/303, 379, 384–386, 397; 210/373, 392

[56] References Cited

U.S. PATENT DOCUMENTS

| | | | |
|---|---|---|---|
| 946,476 | 1/1910 | Warner | 209/270 X |
| 1,670,473 | 5/1928 | Milne | 209/270 |
| 1,675,612 | 7/1928 | Laird | 209/270 |
| 1,882,662 | 10/1932 | Haug | 209/270 |
| 2,356,289 | 8/1944 | Wells | 209/270 |
| 3,311,235 | 3/1967 | Ahlfors et al. | 209/270 |
| 3,387,708 | 6/1968 | Salomon et al. | 209/379 X |
| 3,404,065 | 10/1968 | Ingemarsson | 209/270 X |
| 3,448,858 | 6/1969 | Delcellier et al. | 209/270 |
| 3,497,060 | 2/1970 | Tra et al. | 209/273 |
| 3,845,863 | 11/1974 | Savia | 209/303 |
| 4,200,537 | 4/1980 | Lamort | 209/273 X |
| 4,529,520 | 7/1985 | Lampenius | 209/397 X |
| 4,717,471 | 1/1988 | Winkler | 209/379 X |

FOREIGN PATENT DOCUMENTS

| | | |
|---|---|---|
| 1131081 | 6/1962 | Fed. Rep. of Germany . |
| 1946948 | 2/1971 | Fed. Rep. of Germany . |
| 2750499 | 5/1979 | Fed. Rep. of Germany . |
| 2924794 | 3/1980 | Fed. Rep. of Germany . |
| 0564638 | 7/1975 | Switzerland . |
| 1053583 | 1/1967 | United Kingdom . |

OTHER PUBLICATIONS

Leaflet "KMW Uni-Screen System" showing pressure sorter Uni-Screen 100, date unknown.

Primary Examiner—Johnny D. Cherry
Assistant Examiner—Edward M. Wacyra
Attorney, Agent, or Firm—Kramer, Brufsky & Cifelli

[57] ABSTRACT

A pressure sorter for fiber suspensions comprises a rotating screen basket and cleaning blades associated therewith. To improve the operating characteristics, stationary cleaning blades are provided on both the inside and the outside of the screen basket, and the screen basket is provided at one end with an axial channel whose diameter is substantially smaller than that of the screen formed by the screen basket.

17 Claims, 4 Drawing Sheets

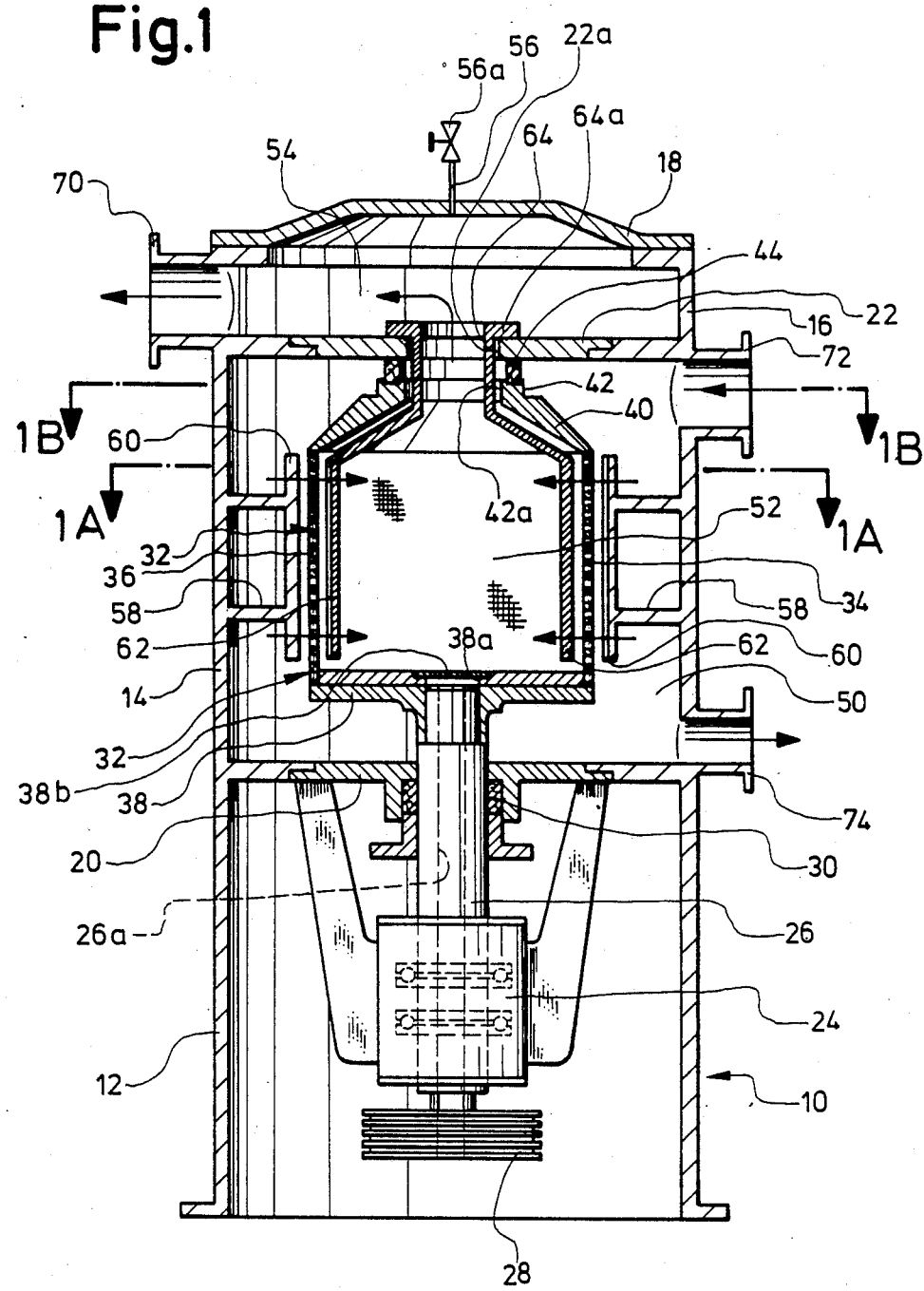

PRESSURE SORTER

The invention relates to a pressure sorter comprising: a housing; a screen which has a screen wall and is mounted for rotation about an upright axis of rotation in said housing, the screen wall being of axially symmetrical configuration in relation to the axis of rotation and separating within the housing a first chamber for a suspension to be sorted from a second chamber for the accepted material which has passed through the screen wall, both of these chambers being arranged concentrically in relation to each other with respect to the axis of rotation; first cleaning blades stationarily arranged in the first chamber which follow the contour of the screen wall at a small distance therefrom; a housing inlet for the suspension to be sorted; a first housing outlet for the accepted material; and a second housing outlet for the rejected material which has not passed through the screen wall.

Pressure sorters wherein a screen basket of circular-cylindrical configuration is stationarily vertically mounted in a pressure sorter housing and cooperates with a rotor which is mounted in the pressure sorter housing for rotation about the screen basket axis, which can be driven via a belt pulley or directly by an electric motor and which is provided with cleaning blades rotating on the inner side or on the outer side or on both the inner side and the outer side of the screen basket are widely propagated. However, these known pressure sorters require a relatively high driving power for the rotor drive.

The prior art also includes pressure sorters of the kind mentioned at the outset, i.e., pressure sorters with a rotating screen and stationary cleaning blades. These require less driving power because the volume of liquid made to circulate therein is lower than in pressure sorters with rotating cleaning blades. It is also of advantage that the pressure sorter screens of axially symmetrical design can be manufactured and stored with high truth of running. For this reason, too, less driving power is required than for the known pressure sorters with a stationary screen basket and rotating cleaning blades.

Known pressure sorters of the kind mentioned at the outset for processing fiber suspensions in the making of paper or cardboard, the improvement of which is the subject of the present invention, comprised either on the outflow, i.e., outlet side or on the inflow, i.e., inlet side of the screen a set of stationary cleaning blades.

A known pressure sorter of the first kind is marketed, for example, by A. B. Karlstads Mekaniska Werkstad, 65115 Karlstad, Sweden, under the name of UNI-SCREEN 100. In this known pressure sorter, a vertical rotor shaft extends all the way through the pressure sorter housing. At the bottom, a belt pulley is keyed onto the rotor shaft and serves to drive it. At the top, a kind of bell is attached to the rotor shaft and carries a screen basket expanding slightly conically in the downward direction. The rotor shaft is mounted for rotation in the pressure sorter housing between this bell and the belt pulley.

The pressure sorter housing comprises in its upper region an inlet for fiber suspension to be sorted which is to flow through the screen basket from the outside to the inside. Arranged immediately adjacent the inner side of the screen basket is a set of stationary cleaning blades. A rejected material outlet is located on the outer side of the screen basket below the latter. The interior of the screen basket is in communication with an accepted material outlet provided in the lower region of the pressure sorter housing.

A known pressure sorter of the second kind is disclosed in German Pat. No. 1,946,948. In this known pressure sorter, fiber suspension to be sorted first flows through an upper region of the rotating screen basket having relatively coarse screen openings in order to hold back coarse impurities, from the outside to the inside. It then flows through the lower two-thirds of the rotating screen basket having finer screen openings, from the inside to the outside. Arranged adjacent to the inner side of the screen basket are stationary cleaning blades. The so-called accepted material flows off via an annular chamber of the pressure sorter housing which surrounds the screen basket and is provided with an outlet connection piece, while an outlet connection piece opening into a groove formed by the housing below the screen basket is provided for the rejected material in the lower region of the pressure sorter housing.

The object underlying the invention is to so improve the known pressure sorters with a rotating screen and stationary cleaning blades arranged on the one screen side that there are less failures during operation. In doing so, use was made of the following knowledge which, as a whole, is new: Stationary cleaning blades arranged on the inflow, i.e., inlet side of a rotating screen prevent fiber suspension to be cleaned from circulating in an unretarded manner with the screen in the region of the screen surface. They slow down the fiber suspension to be cleaned and bring about a comparatively high relative speed between the rotating screen and fiber suspension to be cleaned flowing into the screen. This increases the separation of long fiber impurities by the screen. Also, the sorting efficiency of the screen is improved by fractionation and by the high relative speed resulting in a more favorable flow-in angle of the fiber suspension at the inflow side of the screen. The cleaning blades located at the outflow, i.e., outlet side of the screen, together with the cleaning blades provided at the inflow side of the screen, prevent fibers from becoming spun together at the outflow, i.e., outlet side of the screen: The cleaning blades prevent other fibers from joining onto, i.e., becoming fixed to fiber ends protruding through the screen openings into the accepted material (with fiber suspensions containing mainly short fibers which do not have a tendency to join onto one another, cleaning blades may, in certain circumstances, be dispensed with at the outflow, i.e. outlet side of the screen). On the basis of this knowledge, the stated object is achieved, in accordance with the invention, in that a pressure sorter of the kind mentioned at the outset also comprises in the second chamber stationary second cleaning blades which follow the contour of the screen wall at a small distance therefrom, and in that the screen is closed in the axial direction at one of its ends, except for an axial channel which is connected with one of the housing outlets and whose cross-section is a fraction of the cross-section of the screen. In inventive pressure sorters wherein the first chamber surrounds the screen wall and the second chamber, and the axial channel of the screen is connected with the accepted material outlet, the pulsations (pressure fluctuations caused by the cleaning blades in the fiber suspension which are by all means desired to prevent clogging of the screen openings) are not propagated in an unattenuated manner to the accepted material outlet of the pressure sorter due to the throttle effect of the relatively narrow axial channel through which the accepted material flows off. In papermaking, they, therefore, affect the sheet formation in the so-called headbox to a lesser degree than is the case with the above-described known pressure sorters with a rotating screen basket and stationary cleaning blades. If, on the other hand, in an inventive pressure sorter, the second chamber surrounds the screen wall and the first chamber, i.e., if the flow through the screen is from the inside to the outside, and if the axial channel of the screen is connected with the rejected material outlet, this provides an elegant possibility for the rejected material to flow off, without unimpeded flow of the fiber suspension from the inflow side of the screen to the rejected material outlet leading to large losses of usable fibers. The last above-described variant of the inventive construction is rendered particularly simple by arranging the axial channel in a drive shaft which is fixedly connected to the screen and whose diameter readily enables a relatively narrow rejected material outflow channel to be accommodated in the drive shaft.

In a particularly advantageous embodiment of the inventive pressure sorter, the housing inlet and the accepted material outlet are arranged on the housing above the screen wall. As previously mentioned, pulsations (pressure fluctuations) occur at the cleaning blades during operation of the pressure sorter and exert a disturbing effect on the accepted material, and also at the housing inlet. If the housing inlet and the accepted material outlet are located in the region (viewed in the radial direction) of the cleaning blades, the danger of pressure fluctuations of relatively large amplitude occurring at the so-called headbox is particularly high. The above-mentioned feature is, therefore, recommended, i.e., that of arranging the housing inlet and the accepted material outlet above the screen wall. Bearing this in mind, it is also advantageous for a neck portion terminating in a cylindrical neck with an axial channel to be secured to one end of the screen wall and for a seal to be provided between the free end of the neck and a housing partition comprising an opening adjacent to the neck channel. In this case, two advantages are obtained: If the flow through the screen is from the outside to the inside, not only the screen openings but also the axial channel of the neck portion act as throttles for the pressure surges caused by the cleaning blades and travelling in the direction of the accepted material outlet. In comparison with the known pressure sorters described at the outset wherein the screen basket is sealed off relative to the pressure sorter housing at the point of its largest diameter, a further considerable advantage is obtained by way of the narrow channel according to the invention, namely that the screen can be sealed off relative to the pressure sorter housing at a point whose diameter is substantially smaller than the diameter of the screen wall. Hence the relative speeds between the parts moved against each other are much smaller in the sealing area and this results in longer service life for the seal. Accordingly, in the inventive pressure sorter, a normal slide ring seal may be used at this point instead of a so-called gap seal which must be constantly supplied with water to achieve the desired sealing.

A particularly advantageous embodiment of the inventive pressure sorter enables two types of operation. In the first type, the flow through the screen wall is from the outside to the inside and in the second type, the fiber suspension to be sorted is introduced into the screen interior. This embodiment is characterized in that the housing comprises, in succession, in the direction of the axis of rotation of the screen, a bearing for the drive shaft connected to the screen, a first partition through which the drive shaft extends, an accommodating chamber for the screen, a second partition and a flow chamber, in that, furthermore, the housing is provided in the screen accommodating chamber with a carrying device for the cleaning blades arranged on the outer side of the screen wall, in that the second partition comprises an opening which is concentric with the axis of rotation and is in communication with the screen interior, and in that connection openings are provided on the housing in the area of the screen accommodating chamber and the flow chamber. In the one type of operation, fiber suspension to be sorted is introduced into the screen accommodating chamber and the accepted material is withdrawn through the axial channel of the screen and the above-mentioned flow chamber. For this type of operation, it is recommended to arrange the drive shaft bearing at the bottom and the flow chamber at the top and to provide an air-release opening with a valve in the part of the pressure sorter housing delimiting the flow chamber upwardly. It is, furthermore, of advantage for the housing to comprise in the area of the screen accommodating chamber two connection openings adjacent to the two partitions, with one of these being closable and forming in the open state the rejected material outlet. For the other type of operation, this rejected material outlet is then closed and the rejected material is withdrawn through the above-mentioned axial channel arranged in the drive shaft. If the flow through the screen is from the outside to the inside and the accepted material is withdrawn through the flow chamber located above the screen, the pulsations propagating in the accepted material are further attenuated by an air cushion forming at the roof of the flow chamber as a result of air liberated from the fiber suspension.

If the cleaning blades arranged in the screen interior are mounted on a support which extends through the axial screen channel and is of sleeve-shaped or tube-shaped configuration, the cleaning blades then lie outside of the accepted material outflow just as in the case where the flow through the screen is from the inside to the outside and the accepted material outlet of the pressure sorter housing is axially offset in relation to the screen wall. In both cases, the aforesaid measures result in a reduction of the amplitude of the pressure fluctuations occurring in the so-called headbox.

Further features, advantages and details of the invention are apparent from the enclosed claims and/or the following description and the appended drawings of two preferred embodiments of the inventive pressure sorter which, with a few modifications, can be constructed from one and the same basic form of the inventive pressure sorter. In the drawings:

FIG. 1 is an axial section through the first embodiment wherein the flow through the screen is from the outside to the inside;

Figure 1B:
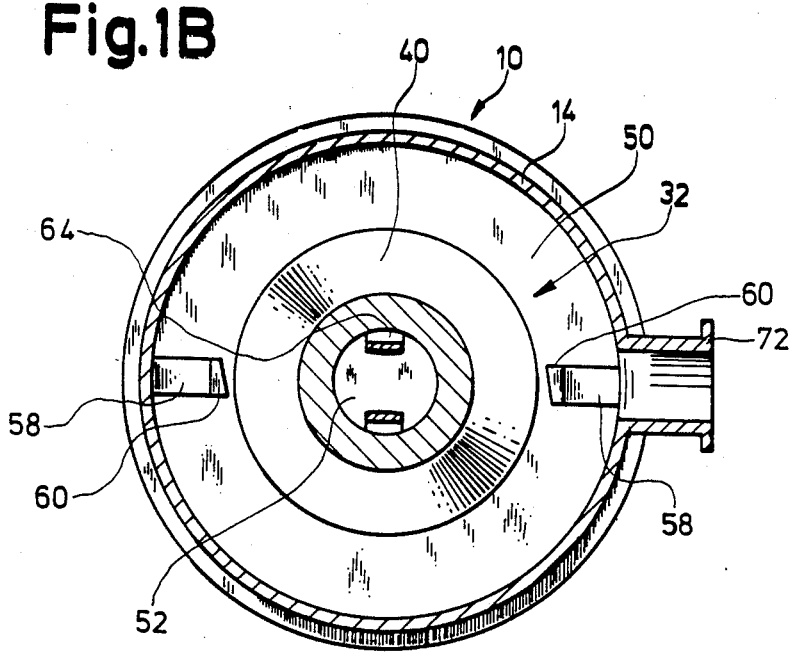
FIG. 1B is a section taken on line B—B in FIG. 1.

FIG. 1 shows a pressure sorter housing 10 with a lower housing section 12, a central housing section 14, an upper housing section 16 closed at the top by a cover 18, a lower partition 20 and an upper partition 22. Attached to the lower partition 20 is a bearing 24 for a drive shaft 26. The drive shaft carries a belt pulley 28 as its drive and extends through the lower partition 20 where it is sealed off by a stuffing box 30. This drive shaft 26 carries a screen designated in its entirety by reference numeral 32. The screen comprises a screen wall 34 of circular-cylindrical configuration having screen openings 36 and forming a screen basket. The screen basket is closed at the bottom by a bottom portion 38 and carries at the top a non-perforated neck portion 40 which is of frusto-conical configuration at the bottom and terminates at the top in a circular-cylindrical neck 42, with a slide ring seal 44 located between the latter and the upper partition 22. As will be explained hereinbelow, the drive shaft 26 is hollow, i.e., it comprises an axial channel for which the bottom portion 38 of the screen 32 is provided with a central opening 38a which in the FIG. 1 embodiment, in accordance with the invention, is closed by a lid 38b.

The screen 32 divides the space enclosed by the central housing section 14 into an outer annular chamber 50 surrounding the screen 32 and an inner chamber 52 in the screen interior communicating via an axial channel 42a of the neck 42 and a central opening 22a of the upper partition 22 with a flow chamber 54 located between the upper partition 22 and the cover 18. Air can be evacuated from this flow chamber through air-release line 56 containing a valve 56a.

Figure 1A:
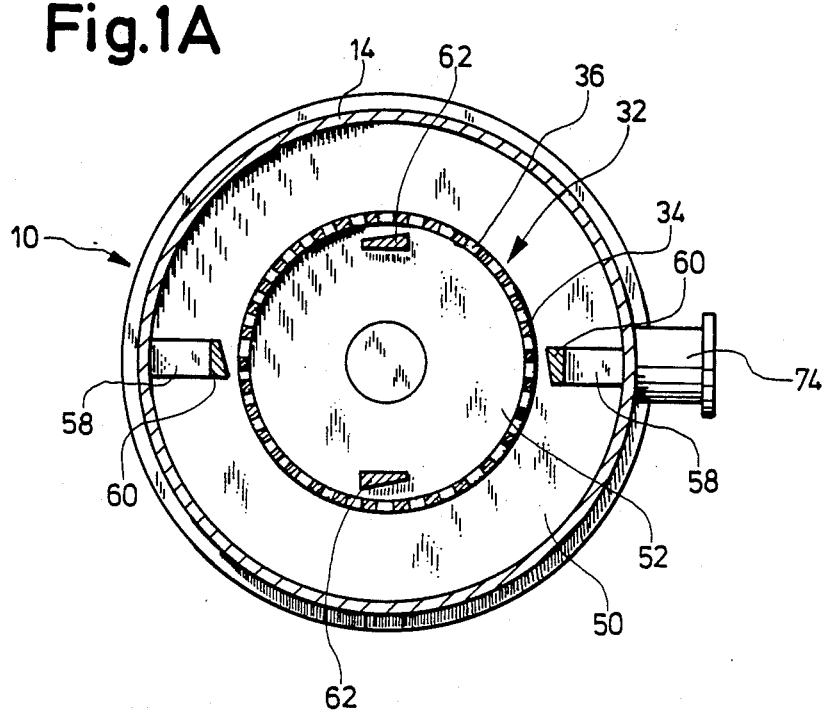
FIG. 1A is a section taken on line A—A in FIG. 1.

Attached to the central housing section 14 is a carrying device 58 for a set of outer cleaning blades 60. Such cleaning blades and their profile shown in FIG. 1A are known per se. Therefore, it need only be pointed out that they generate in the fiber suspension carried along by the rotating screen wall 34—viewed in the circulating direction—in front of the respective cleaning blade an overpressure and behind the cleaning blade an underpressure, with the latter resulting in a backwashing effect at the screen openings 36. Inner cleaning blades 62 are attached to a support sleeve 64 of similar shape to the neck portion 40, i.e., frusto-conical at the bottom and tubular at the top, which extends through the axial channel 42a of the neck portion and is secured by a support flange 64a on the upper partition 22.

Finally, the pressure sorter housing 10 comprises at the upper housing section 16 an upper connection piece 70 and at the central housing section 14 at the top thereof a central connection piece 72 and at the bottom thereof a lower connection piece 74.

The direction of flow of the fiber suspension through the pressure sorter in the FIG. 1 embodiment is indicated by arrows in FIG. 1. Accordingly, the fiber suspension to be sorted is introduced through the central connection piece 72 which, therefore, forms the housing inlet. It is expedient to allow this connection piece to open tangentially into the circular-cylindrical pressure sorter housing. The fiber suspension to be cleaned is then separated by the screen wall 34 into the so-called accepted material which passes through the screen openings 36 from the outside to the inside, and the so-called rejected material which leaves the pressure sorter through the lower connection piece 74 which, in this case, forms the rejected material outlet. The accepted material flows through the axial channel 42a upwardly into the flow chamber 54 and leaves the pressure sorter through the upper connection piece 70 which, in this case, forms the accepted material outlet.

Figure 2:
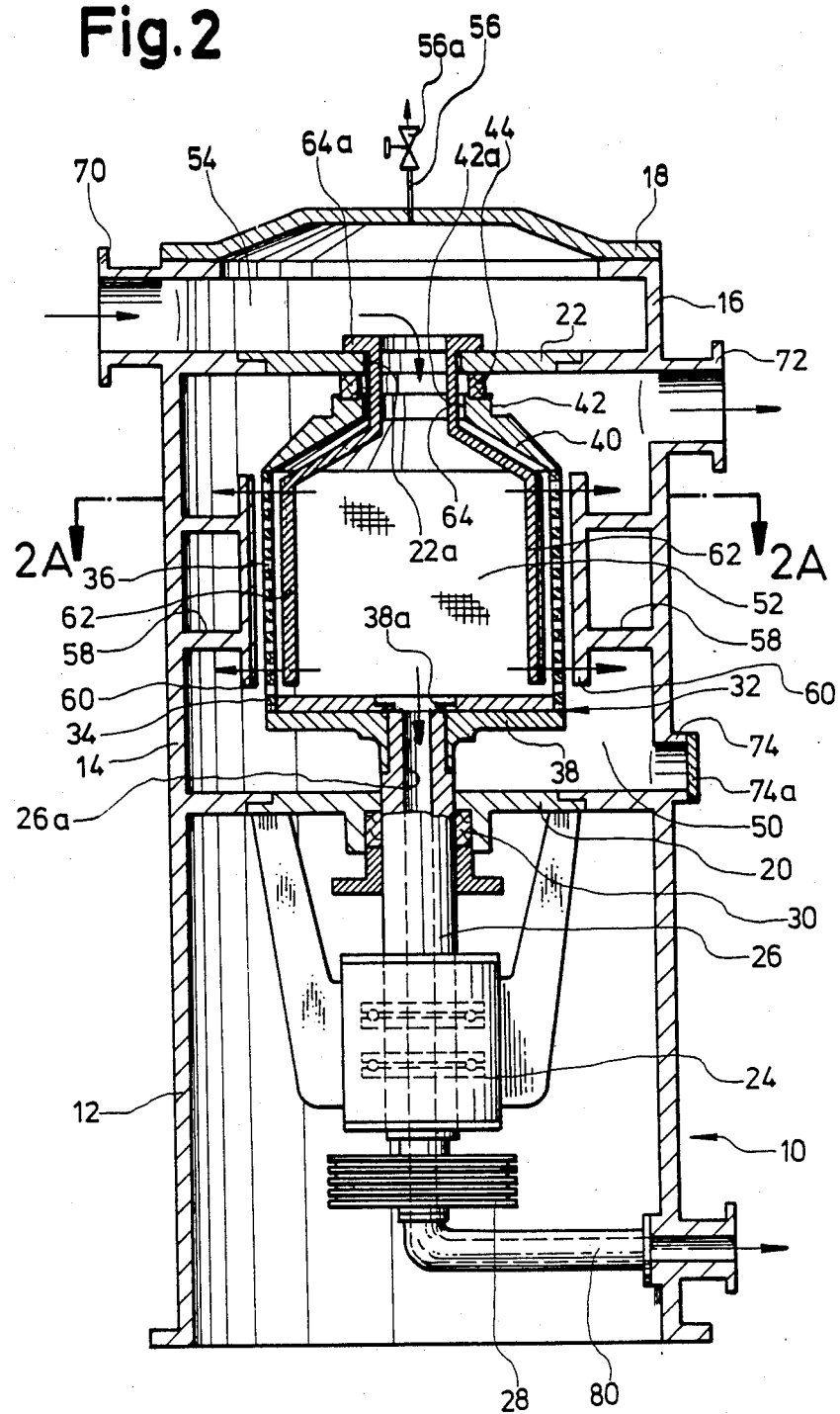
FIG. 2 is an axial section through the second embodiment.
Figure 2A:
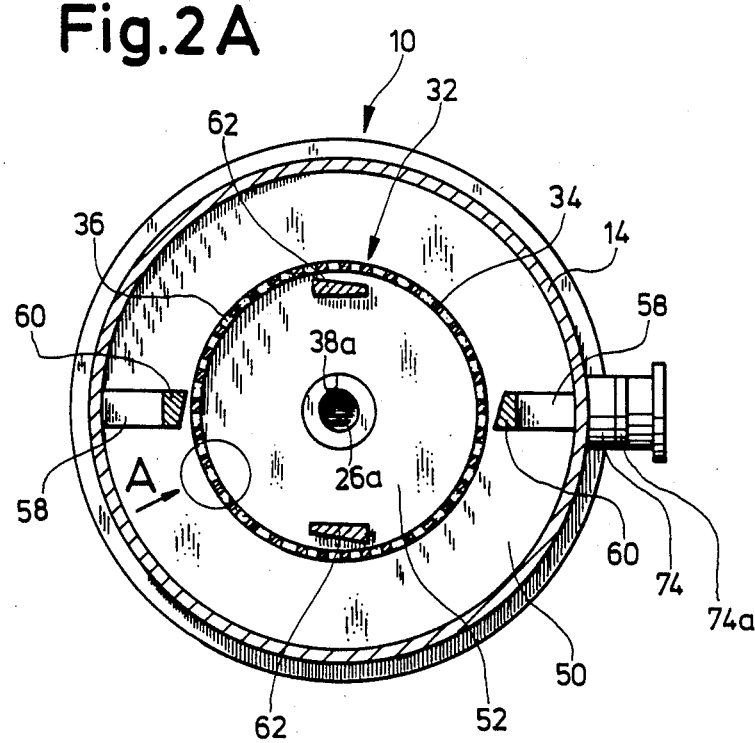
FIG. 2A is a section through this second embodiment corresponding to line A—A in FIG. 2.

If the inventive pressure sorter is modified as shown in FIGS. 2 and 2A, the flow through the screen is from the inside to the outside. For this purpose, the lower connection piece 74 is closed by a cover 74a, while the cover 38b shown in FIG. 1 is removed to open the previously mentioned central axial channel 26a of drive shaft 26. This channel opens at the bottom via a suitably designed seal into a rejected material outlet pipe 80. In accordance with the reversed direction of flow through the screen wall 34, i.e., from the inside to the outside, in the modification shown in FIGS. 2 and 2A, the cleaning blade profiles are of precisely opposite orientation to those of the modification according to FIGS. 1, 1A and 1B.

Figure 3:
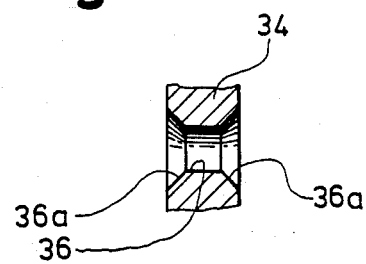
FIG. 3 is a section through a portion of the screen wall of the inventive pressure sorter.

As is apparent from FIG. 3, the screen openings 36 are, in accordance with the invention, provided on both sides with expansions 36a whose cross-section widens, more particularly, continuously, in the direction toward the adjacent screen wall surface. In this way, the known advantages obtained by such expansions are achieved independently of whether the flow through the screen 32 is from the outside to the inside or from the inside to the outside.

It is expedient for the diameter ratio of screen wall 34 and axial channel 42a and 26a, respectively, to be in the range of between 2:1 and 5:1, more specifically, for the axial channel 42a, in particular, 3:1, and for the axial channel 26a, in particular, 4:1.

What is claimed is:
1. A pressure sorter comprising:
    a housing;
    a screen which has a screen wall and is mounted for rotation about an upright axis of rotation in said housing, said screen wall being of axially symmetrical configuration in relation to said axis of rotation and separating within said housing a first chamber for a fiber suspension to be sorted from a second chamber for the accepted material which has passed through said screen wall, both of said chambers being arranged concentrically in relation to each other with respect to said axis of rotation;
    a set of first cleaning blades stationarily arranged in said first chamber, said first blades being spaced from each other in the circumferential direction of the screen wall and following the contour of said screen wall at a small distance therefrom;
    a set of second cleaning blades stationarily arranged in said second chamber, said second blades being spaced from each other in the circumferential direction of the screen wall and following the contour of said screen wall at a small distance therefrom;
    a housing inlet opening for the fiber suspension to be sorted;
    a first housing outlet opening for the accepted material;
    a second housing outlet opening for rejected material which has not passed through the screen wall;
    said screen being closed in the axial direction at least at one of its ends, except for an axial channel, by an end portion fastened to said screen wall and being provided with a cylindrical neck having said axial channel which neck communicates with one of said housing openings and whose cross-section is substantially smaller than the cross-section of said screen;

said housing having a partition wall with an opening adjacent to said neck; and a seal between said partition wall opening and said neck.

2. A pressure sorter as claimed in claim 1, wherein said first chamber surrounds said screen wall and said second chamber, and said axial channel of said screen communicates with said first housing outlet opening.

3. A pressure sorter as claimed in claim 2, wherein said housing inlet opening and said first housing outlet opening are arranged on said housing above said screen wall.

4. A pressure sorter as claimed in claim 3, wherein said screen is closed at its lower end.

5. A pressure sorter as claimed in claim 1, wherein said second chamber surrounds said screen wall and said first chamber, and said axial channel of said screen communicates with said second housing outlet opening.

6. A pressure sorter as claimed in claim 5, wherein said screen has a drive shaft with an axial channel which communicates with said second housing outlet opening.

7. A pressure sorter as claimed in claim 6, wherein said housing comprises, in succession, in the direction of the axis of rotation of the screen, a bearing for said drive shaft connected to said screen, a lower partition wall through which said drive shaft extends, an accommodating chamber for said screen, said partition wall having said opening adjacent to said neck, and a flow chamber, said housing being provided in said screen accommodating chamber with a carrying device for the cleaning blades arranged on the outer side of said screen wall, said opening in said partition wall being concentric with said axis of rotation and communicating with the screen interior, and wherein said housing inlet opening and said first and second housing outlet openings are provided on said housing in the area of said screen accommodating chamber and said flow chamber.

8. A pressure sorter as claimed in claim 7, wherein said first and second housing outlet openings are adjacent to said screen accommodating chamber, and one of said first and second openings is closable.

9. A pressure sorter as claimed in claim 7, wherein said bearing is arranged below said screen accommodating chamber, a portion of said housing below said lower partition wall is provided with said second housing outlet opening, and said second housing outlet opening communicates with said axial channel of said drive shaft.

10. A pressure sorter as claimed in claim 1, wherein said cleaning blades arranged in the screen interior are mounted on a support which extends through said axial channel.

11. A pressure sorter as claimed in claim 1, wherein said end portion is of conical configuration between said cylindrical neck and said screen wall.

12. A pressure sorter as claimed in claim 11 wherein said second cleaning blades are supported by a sleeve which follows the conical contour of said end portion.

13. A pressure sorter as claimed in claim 1, wherein the ratio of the diameter of said screen wall to the diameter of said axial channel is between 2:1 and 5:1.

14. A pressure sorter as claimed in claim 13, wherein the diameter ratio is approximately 3:1.

15. A pressure sorter as claimed in claim 13, wherein the diameter ratio is approximately 4:1.

16. A pressure sorter as claimed in claim 1, wherein said screen wall comprised screen openings whose cross-section widens at their inflow-end and at their outflow-end, respectively, in the direction towards the screen wall surface.

17. A pressure sorter comprising:

a housing:

a screen which has a screen wall and is mounted for rotation about an upright axis of rotation in said housing, said screen wall being of axially symmetrical configuration in relation to said axis of rotation and separating within said housing a first chamber outside of said screen from a second chamber within said screen, both of said chambers being arranged concentrically in relation to each other with respect to said axis of rotation;

a set of first cleaning blades stationarily arranged in said first chamber, said first blades being spaced from each other in the circumferential direction of the screen wall and following the contour of said screen wall adjacent to said screen wall; and a set of second cleaning blades stationarily arranged in said second chamber, said second blades being spaced from each other in the circumferential direction of the screen wall and following the contour of said screen wall adjacent to said screen wall; and wherein said housing has a first opening which communicates with said first chamber, and a second opening which is spaced from said first opening and communicates with said first chamber;

a conical end portion having a flared end fixedly mounted to said screen wall;

a partition wall within said housing bounding in part said first chamber, said partition wall having an opening at a narrow end of said end portion; and a seal between said partition wall and the narrow end of said end portion permitting rotation of said end portion and said screen relative to said partition wall, said end portion defining a channel therethrough which communicates with the opening in said partition wall; and wherein said housing has a third opening which communicates with the opening in said partition wall and said second chamber; and further comprising a drive shaft connected to said screen and located within said housing to rotate said screen, said drive shaft having an axial channel which communicates with said second chamber; and wherein said housing has a fourth opening which communicates with the axial channel in said drive shaft when said axial channel is open; and further comprising means for sealing said axial channel in said drive shaft such that said fourth opening does not communicate with said second chamber and said pressure sorter is operable with said first opening introducing a fibrous suspension to be sorted, said second opening rejecting material which has not passed through the screen wall, and said third opening accepts material which has passed through said screen wall; and means for sealing said second opening, and operating said pressure sorter with said axial channel open such that said third opening introduces a fibrous suspension to be sorted, said first opening accepts material which has passed through said screen wall, and said fourth opening rejects material which has not passed through said screen wall.

* * * * *